(12) United States Patent
Schmidt et al.

(10) Patent No.: US 7,508,104 B2
(45) Date of Patent: Mar. 24, 2009

(54) MAGNETIC COUPLING ARRANGEMENT FOR TRANSMITTING A TORQUE

(76) Inventors: Karl Schmidt, Kuhlaendler Weg 1b, 84478 Waldkraiburg (DE); Michael Schmidt, Kuhlaendler Weg 1b, 84478 Waldkraiburg (DE)

( * ) Notice: Subject to any disclaimer, the term of this patent is extended or adjusted under 35 U.S.C. 154(b) by 140 days.

(21) Appl. No.: 10/583,613

(22) PCT Filed: Dec. 23, 2004

(86) PCT No.: PCT/DE2004/002808

§ 371 (c)(1),
(2), (4) Date: Jun. 20, 2006

(87) PCT Pub. No.: WO2005/064776

PCT Pub. Date: Jul. 14, 2005

(65) Prior Publication Data
US 2007/0103022 A1    May 10, 2007

(30) Foreign Application Priority Data
Dec. 29, 2003  (DE) ................................ 103 61 378

(51) Int. Cl.
*H02P 15/00* (2006.01)
*H02K 5/10* (2006.01)
(52) U.S. Cl. ........................ 310/104; 310/103
(58) Field of Classification Search .................. 310/103, 310/104
See application file for complete search history.

(56) References Cited

U.S. PATENT DOCUMENTS

| | | | | |
|---|---|---|---|---|
| 1,562,730 | A * | 11/1925 | Andrews | 310/103 |
| 3,483,412 | A * | 12/1969 | Bakker et al. | 310/103 |
| 3,890,515 | A * | 6/1975 | Fehr et al. | 310/104 |
| 3,936,683 | A * | 2/1976 | Walker | 310/103 |
| 4,146,805 | A * | 3/1979 | Fehr et al. | 310/104 |
| 4,396,849 | A * | 8/1983 | Taiani | 310/92 |
| 4,896,064 | A * | 1/1990 | Taiani | 310/104 |

FOREIGN PATENT DOCUMENTS

| | | | |
|---|---|---|---|
| DE | 3732766 A1 | * | 4/1988 |
| DE | 3807083 A1 | * | 9/1989 |
| DE | 689 15 713 T2 | | 6/1990 |
| EP | 255723 A | * | 2/1988 |
| GB | 2145882 A | * | 4/1985 |

* cited by examiner

*Primary Examiner*—Burton Mullins
*Assistant Examiner*—Alex W Mok
(74) *Attorney, Agent, or Firm*—Milde & Hoffberg, LLP

(57) ABSTRACT

A magnetic arrangement for transmitting torque from an input shaft (1) to an output shaft (2), of for example a pump, comprises at least one magnet arrangement (3, 4) assigned to each of the input shaft (1) and to the output shaft (2). A containment shell (5) comprising at least one inner sleeve (3) and at least one outer sleeve (4) extends between the magnet arrangements. An inner sleeve (3) is formed from at least one profile element (7) that extends approximately in the manner of a coil, as a unitary helical band with a mating protrusion and groove on opposite sides. An outer sleeve (4) is provided for axially fastening the profile element.

23 Claims, 5 Drawing Sheets

MAGNETIC COUPLING ARRANGEMENT FOR TRANSMITTING A TORQUE

BACKGROUND OF THE INVENTION

The invention relates to a magnetic coupling arrangement for transmitting torque from an input shaft to an output shaft, whereby at least one magnet arrangement is assigned to the input shaft and to the output shaft, and whereby a containment shell comprising at least one inner sleeve and at least one outer sleeve extends between the magnet arrangements.

Such magnetic coupling arrangements are used for the contact-free transmission of forces, e.g., between two hermetically sealed separate spaces, which are coupled by magnetic fields alone without any additional mechanical connections. The magnetic couplings may be used with magnetic pumps or the like, for example. In addition, such coupling systems may be used for agitators, blowers, mixers, centrifuges or similarly moving apparatuses.

The containment shell of such magnetic couplings can be manufactured, for example, of non-metallic materials such as ceramics, carbon fiber composites or synthetics.

Such containment shells do not have any eddy current losses, however, the use of these containment shells is significantly limited due to the rising pressures and temperatures. In addition, all-metal containment shells are known. Due to moving magnetic fields, high eddy currents arise in metallic containment shells, requiring additional drive loads, which is reflected in the form of heat in the magnetic space.

The eddy currents increase as the transfer performance, the containment shell wall thickness and/or the circumferential speed of the magnetic coupling increases, such that the efficiency of, for example, magnetic couplings with a metallic containment shell is influenced negatively. Furthermore, magnetic coupling arrangements are known that exhibit a containment shell with a so-called sandwich design.

Such a containment shell is known from the German Patent No. 689 15 713. This patent discloses a low-loss, synchronous, magnetic drive system that comprises a magnetic coupling arrangement, whereby the magnetic coupling exhibits a containment shell comprising an inner sleeve and an outer sleeve. With the known drive system, the inner sleeve is designed with numerous parallel core laminations or ring elements, respectively.

This has the disadvantage of requiring numerous components for the inner sleeve. In addition to increased manufacturing and assembly costs, another disadvantage is that the individual core laminates must be aligned to each other during assembly.

A relatively large portion of the volume of the part of the cylinder that is pressurized and to some degree exposed to aggressive media is not made of metal but of flat gasket material.

Furthermore, various elastomers are necessary for sealing the pressure cylinder with said elastomers being located in the product space just as the spring component. The outer body does not form an additional sealed protective sleeve. In addition, maintenance costs for a containment shell designed in this manner are relatively high because disassembly and reassembly of the containment shell is time-consuming due to the many components.

SUMMARY OF THE INVENTION

It is the principal objective of the present invention to propose a magnetic coupling arrangement of the type described above that essentially exhibits a high efficiency and is designed in an assembly- and maintenance-friendly manner and exhibits maximum operational reliability.

This objective, as well as further objectives which will become apparent from the discussion that follows are achieved, according to the present invention, by providing a magnetic coupling arrangement for transmitting torque from an input shaft to an output shaft, whereby at least one magnet arrangement is assigned to the input shaft and to the output shaft, and whereby a containment shell comprising at least one inner sleeve and at least one outer sleeve extends between the magnet arrangements. According to the invention, the inner sleeve can be formed from at least one profile element or the like that extends approximately in the manner of a coil and the outer sleeve can be provided for axially fastening the profile element.

In this manner, the inner sleeve of the containment shell can be made of one component that is wound in the manner of a coil like a helical spring of continuous material such that the manufacturing costs and the maintenance costs of the coupling arrangement subject to the invention are reduced significantly. By selecting the number of windings and by specifying the winding radius, various dimensions of containment shells can be realized, preferably of the same continuous profile, corresponding to the application. Materials that can be used are, for example, alloys such as the 1.4571 or 2.4610 alloy.

Overall, the magnetic coupling arrangement subject to the invention results in low-loss containment shells with a very compact design, where the eddy current losses are reduced when compared to full-metal containment shells and the function of the magnetic coupling can be used efficiently.

Within the scope of one advantageous embodiment of the present invention, it may be provided that the profile element that extends in the manner of a coil or of a helical spring exhibits at least on a first side a groove or the like and on a second side, which is oriented parallel to said first side, exhibits at least one protrusion or the like that is fitted to said groove, such that the protrusion and the groove of adjacent windings of the profile element that is arranged in the manner of a coil are engaged in each other. In this manner, a groove and tongue connection can be realized that enables a chambered sealing arrangement and simultaneously realizes a centering of the shifting windings of the profile element to each other.

However, other design shapes for the profile element used for connecting purposes, such as round or double grooves or smooth connections are imaginable as well. In addition to the shapes mentioned, other profile shapes are also possible. For example, flat rectangular profiles, round profiles, double-groove profiles, hollow profiles or the like can be imagined. When using hollow profiles, it is possible to provide one profile each for the feed and the return such that heating or cooling of the containment shell can be realized.

To achieve optimum sealing between the individual windings of the profile element, it can be provided according to another embodiment of the invention that a sealing material is provided preferably between the two contacting sides of different windings of the profile element. Particularly advantageous is the use of continuous goods such as a sealing tape, a sealing cord, a sealing compound or the like. In this manner, the inner sleeve of the magnetic coupling arrangement subject to the invention offers an autonomous hermetically sealed pressure sleeve. However, a coating can be imagined for sealing purposes as well.

According to another development of the invention, it may be provided that the outer sleeve exhibits an approximately cylindrical jacket with an approximately circular bottom.

The bottom is attached to the jacket. For example, the bottom may be welded to the jacket. However, detachable attachment means can be imagined as well. The other end of the jacket is attached to a flange directly connected to the housing. Here too, a detachable and a non-detachable manner of fastening can be selected. In this manner, the outer sleeve forms a second hermetical seal such that no medium can escape even if a leak develops at the inner sleeve. Suitable sensors can be provided to monitor a degree of tightness.

To further reduce eddy current losses, the jacket of the outer sleeve may be designed with slots in certain sections according to another variation of the invention. The pressure stability of the outer sleeve can be increased if no continuous slots running in the longitudinal direction of the jacket are used. It can also be imagined that the jacket is only notched in sections in the longitudinal direction. With this design, it may be provided for further reduction of the occurring eddy currents that at least one hole is introduced in the notches. Preferably, the notches can be perforated in any manner. The notches and the perforation can be introduced by etching or laser technology, for example.

To seal a notched or slotted sleeve as well, it may be provided that the slots, the notches and/or the perforation are sealed appropriately. Preferably, the outer and/or the inner side of the jacket of the outer sleeve can be sealed using a film of, for example, PTFE or another material. This material may be, for example, a synthetic resin, a fiber composite material, also an applied ceramic material, or the like. In this manner, an escape of the product can also be prevented through the outer sleeve.

It has proven to be advantageous if a solid support ring remains at the jacket between the notches and/or slotted sections of the jacket in the direction of the circumference. This makes the outer sleeve even less sensitive to pressure loads. The efficiency of the coupling arrangement subject to the invention can be further improved through recesses in the magnet arrangements.

For axial fastening of the inner sleeve to a flange that is directly connected to the housing, for example, of a pump or the like, it may be provided that the bottom of the outer sleeve compresses the windings of the profile element in axial direction such that the profile element is fastened to the flange on the housing. Preferably, it can be provided that the end sections of the outer sleeve and of the inner sleeve facing the flange are fastened to said flange. For example, the end sections may be welded to the flange or fastened to it in a detachable manner.

In order to achieve a suitable initial tension of the inner sleeve versus the flange, it can be provided according to an additional embodiment of the present invention that a spring-loaded connection is provided between the inner sleeve and the outer sleeve. Each suitable component can be designed spring-loaded. For example, the bottom of the outer sleeve can be designed as a spring plate. It is also possible to design the material and structure of a fixed abutment element and the adjacent components such as the sleeves, the bottoms and/or the profile elements such that the spring force necessary for reliable sealing is applied.

Another possible variation of the invention may provide that at least one spring element is located between the bottom of the inner sleeve and the bottom of the outer sleeve. A sufficient initial tensioning force may be applied during assembly of the inner sleeve for the axial fastening via the spring element, which may be a disc spring or the like, for example. The spring element may also be realized at the flange component, for example.

An additional variation of the present invention may propose a certain design of the magnet arrangement, in particular at the magnetic coupling arrangement subject to the invention but also at other magnetic couplings. Preferably, each magnet arrangement can exhibit magnets with different polarities. The outer magnet arrangement can be fastened to the input shaft and the inner magnet arrangement to the output shaft. Preferably, the magnet arrangements are designed in the shape of a ring and are protected from mechanical and chemical stress. However, other structural designs of the magnet arrangement are possible as well.

Every magnet arrangement can exhibit at least one magnet ring, which exhibits in the radial direction at least one alternating polarization N, S. Several magnet rings can form one group, whereby the magnet rings of each group in general exhibit the same polarity in the longitudinal direction. The magnet rings of one group can be arranged preferably with or without gaps. Other polarization directions are imaginable as well. For example, each magnet ring may only exhibit one pole N, S in the radial direction.

According to an additional development, it can be provided that each magnet arrangement exhibits several groups each with different polarizations in relation to each other and arranged in succession in the longitudinal direction. A gap can be provided between the individual groups. However, it is also possible to arrange the groups without gap in the longitudinal direction.

The efficiency of the magnetic coupling arrangement subject to the invention can be further increased if the spaces between the various groups are assigned in the longitudinal direction in the area of the support rings at the jacket.

According to another development of the present invention, it can be provided that the respective magnet arrangements are oriented towards each other at the outer sleeve and the inner sleeve such that each time magnets with different polarization are opposite to one another. However, other arrangement options can be imagined as well.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
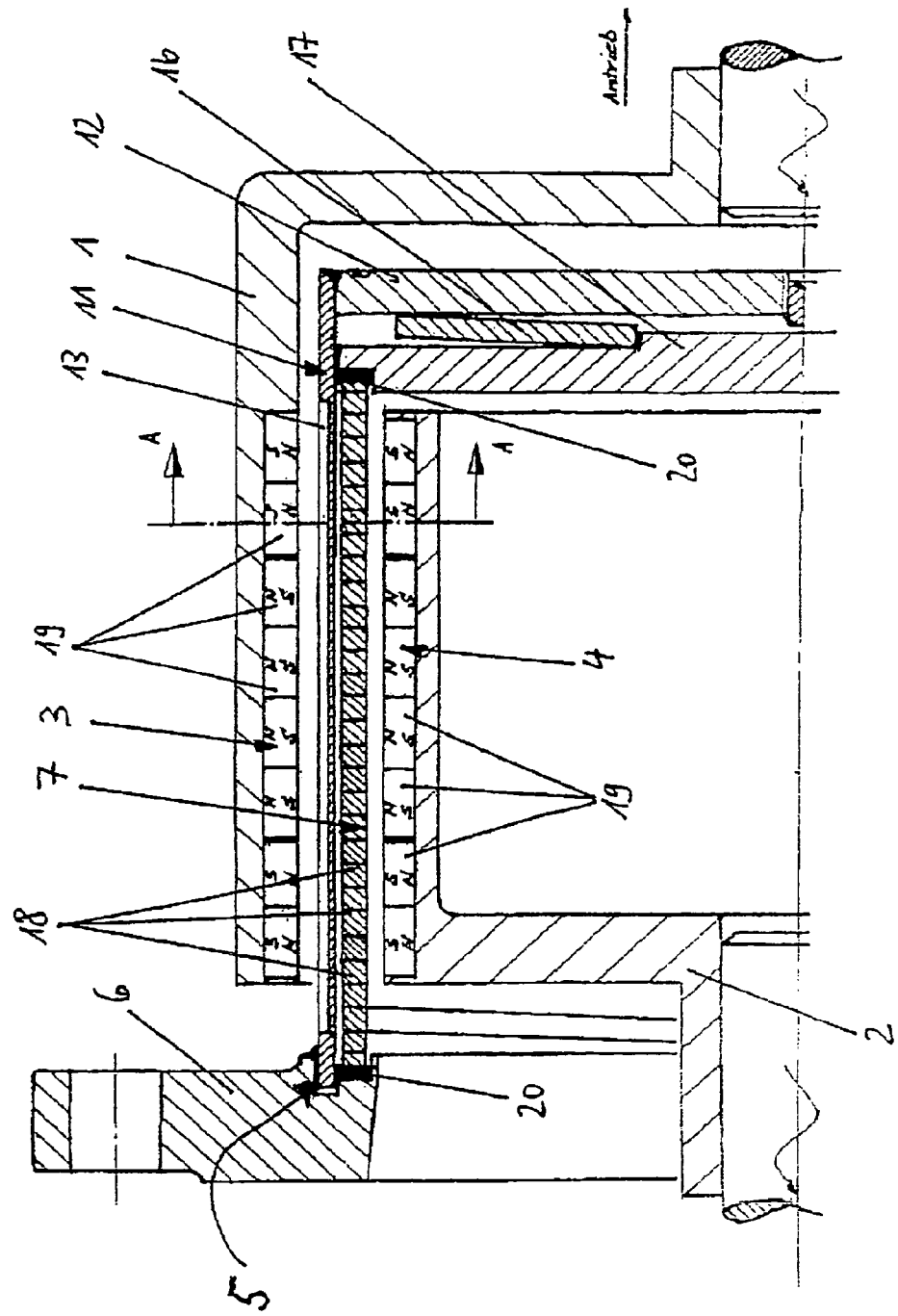
FIG. 1 shows a section of a partial view of a possible embodiment of a magnetic coupling arrangement according to the present invention.

The preferred embodiments of the present invention will now be described with reference to FIGS. 1-5 of the drawings. Identical elements in the various figures are designated with the same reference numerals.

FIG. 1 shows a preferred embodiment of a magnetic coupling arrangement according to the invention for transmitting torque from an input shaft 1 to an output shaft 2 of an otherwise not shown apparatus.

With the magnetic coupling arrangement subject to the invention, an outer magnet arrangement 3 is provided at the input shaft 1 and an inner magnet arrangement 4 at the output shaft 2.

The outer magnet arrangement 3 and the inner magnet arrangement 4 each exhibit different magnets with different polarities and the polarity of each magnet is designated by the letters N (north pole) and S (south pole). The outer and inner magnet arrangement 3,4 of the shown variation of the magnetic coupling arrangement each shows three groups of magnet rings 19, whereby the magnet rings 19 of a group always exhibit the same orientation of the polarity. An alternating polarity N, S in the radial direction can be provided for each magnet ring 19.

Figure 2:
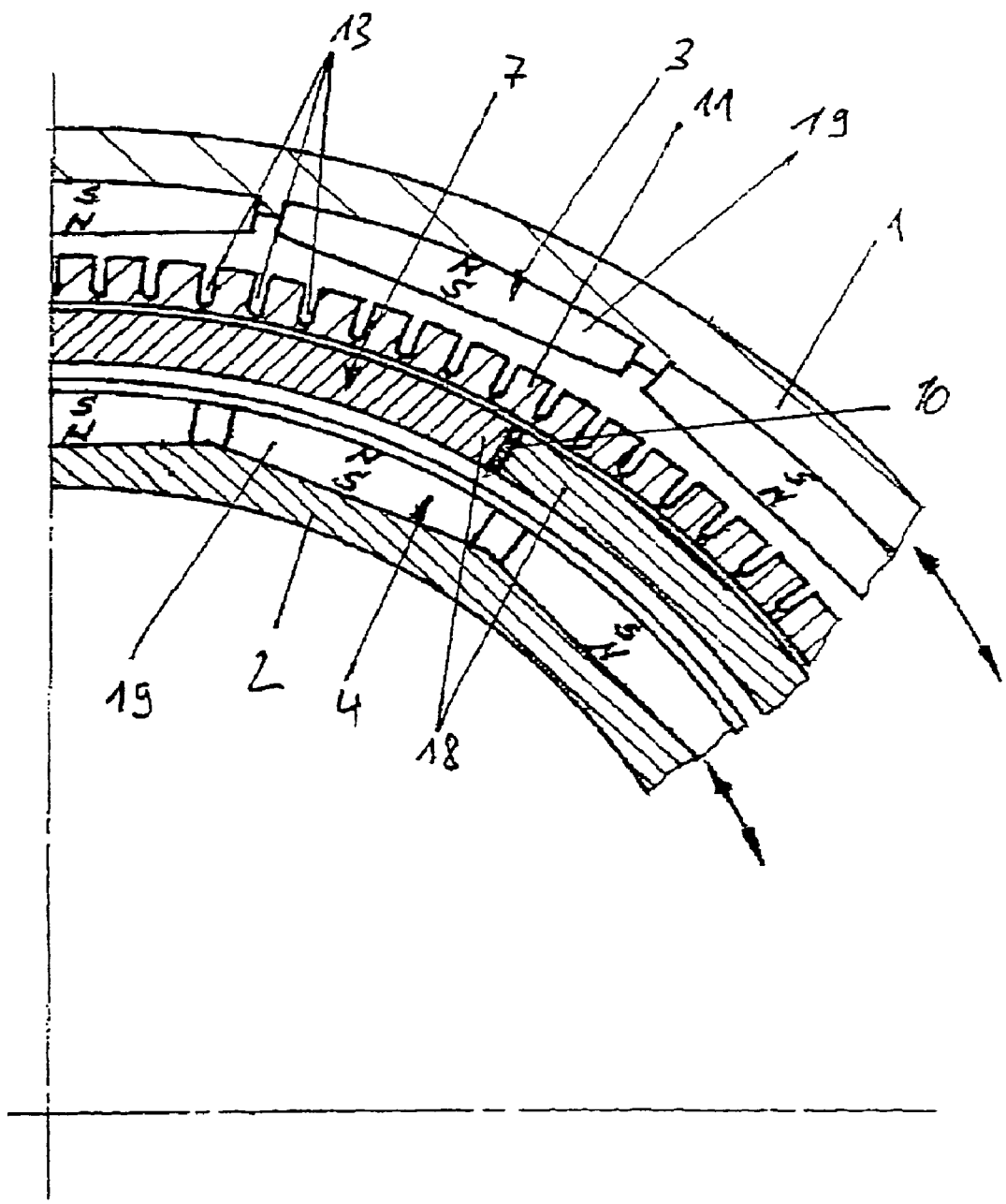
FIG. 2 shows a section of a partial view along the lines A-A of FIG. 1.

The magnet arrangements 3,4 each exhibit a first group with two magnet rings 19, a second group with four magnet rings 19 and finally a third group again with two magnet rings 19, as is apparent especially from FIGS. 1 and 2.

A containment shell 5 comprising an inner sleeve and an outer sleeve extends between the two magnet arrangements 3,4. With this exemplary embodiment, the outer sleeve is welded with its one end at a flange that is directly connected to the housing and with the other end at the bottom 12. A different variation provides that a detachable elastic connection is provided at the flange 6 and/or at the bottom 12. The inner sleeve is designed plane at the ends and contacts the flange 6 and the bottom 17 via a sealing compound.

According to the invention, at the magnetic coupling arrangement, the inner sleeve is formed of a profile element 7 that extends in the manner of a coil. The profile element 7 exhibits at the end that points away from the flange 6 a bottom 17 that is fastened to the end of the profile element 7 and is sealed. The outer sleeve is used for axial fastening and radial support of the profile element 7, with details of the design and the type of fastening of the respective components of the proposed magnetic coupling arrangement being presented in FIGS. 2 to 5.

FIG. 2 shows a sectional view along the line A-A of FIG. 1. Double-arrows indicate the respective possible rotational movements of the input shaft 1 and the output shaft 2, whereby the input shaft 1 functions as a driving magnet cup and the output shaft 2 as a driven rotor.

Figure 3:
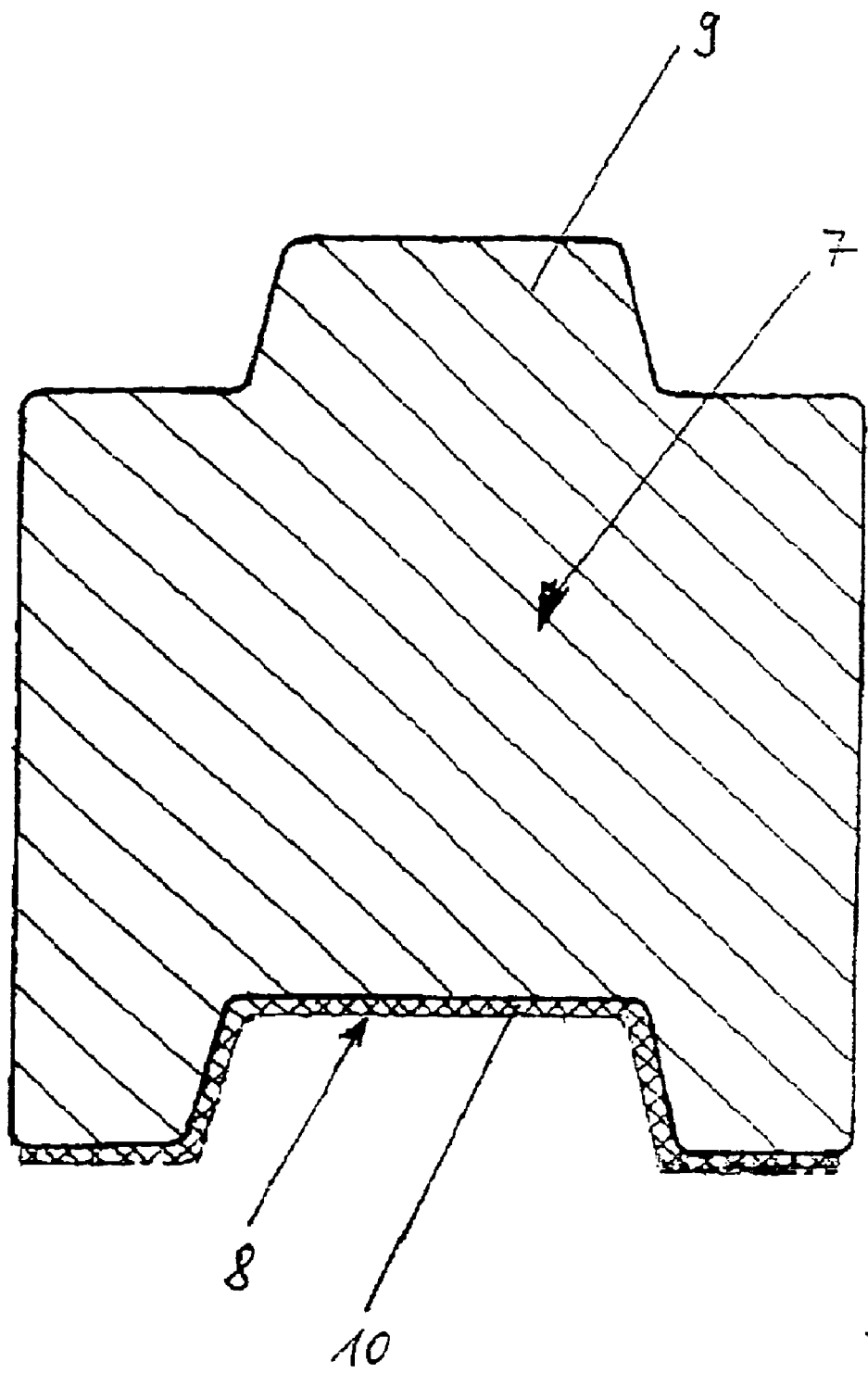
FIG. 3 shows a cross-sectional view of a profile element of the magnetic coupling arrangement according to the invention.

FIG. 3 shows a magnified cross-sectional view of the profile element 7 that is used as the inner sleeve. A tongue and groove connection is provided to connect the individual windings 18 of the profile element 7 that extends in the manner of a coil to one another. For this purpose, the profile element 7 exhibits on a first side a groove 8 with an approximate trapezoidal cross-section. At a second side that is oriented parallel to the first side, a protrusion 9 is provided that is fitted to the groove 8, such that the protrusion 9 and the groove 8 of adjacent windings 18 can engage in one another. To achieve a seal between the groove 8 and the protrusion 9, a sealing material 10, such as a sealing tape, a sealing cord liquid material, direct coating material or a jacket may be provided in the groove 8.

Figure 4:
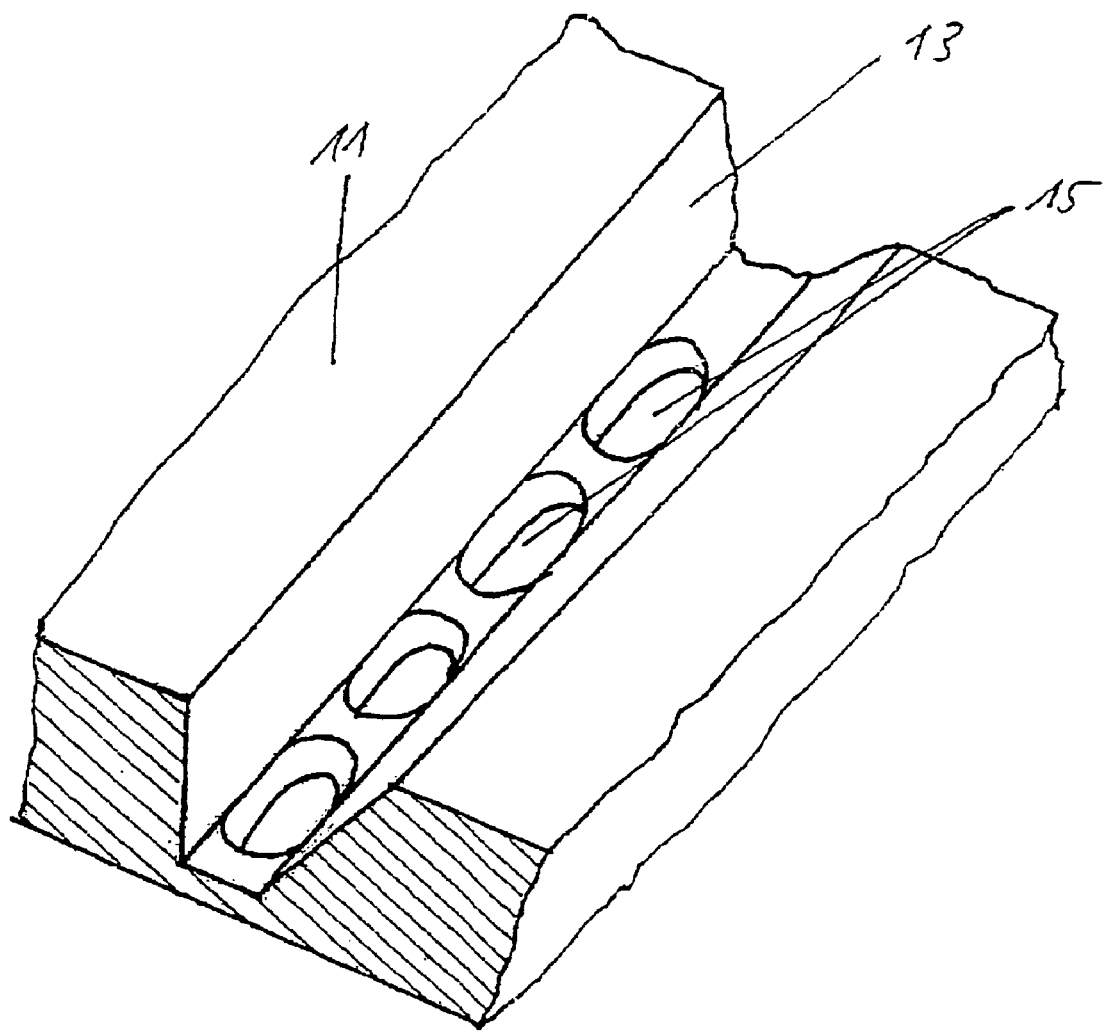
FIG. 4 shows a schematic partial view of an outer sleeve of the magnetic coupling arrangement according to the invention.

FIG. 4 is a magnified partial view of the outer sleeve. The outer sleeve exhibits an approximately cylindrical jacket 11 with an approximately circular bottom 12. Notches 13 are introduced in the cylindrical jacket 11 in the longitudinal direction of the outer sleeve, whereby at the shown embodiment the notches 13 are only introduced in sections, such that support rings 14 with a greater wall thickness remain between the notches 13, which is shown particularly in FIG. 5. The support rings 14 give the jacket 11 a high pressure resistance. As can be seen in FIG. 4, the notches 13 can be perforated in that the remaining wall thickness is reduced by holes 15 in the longitudinal direction of the notches 13. To improve operational reliability, the holes 15, the notches and/or the slots can be sealed. The sealing (not shown) can be provided on the inside and on the outside of the jacket 11.

Figure 5:
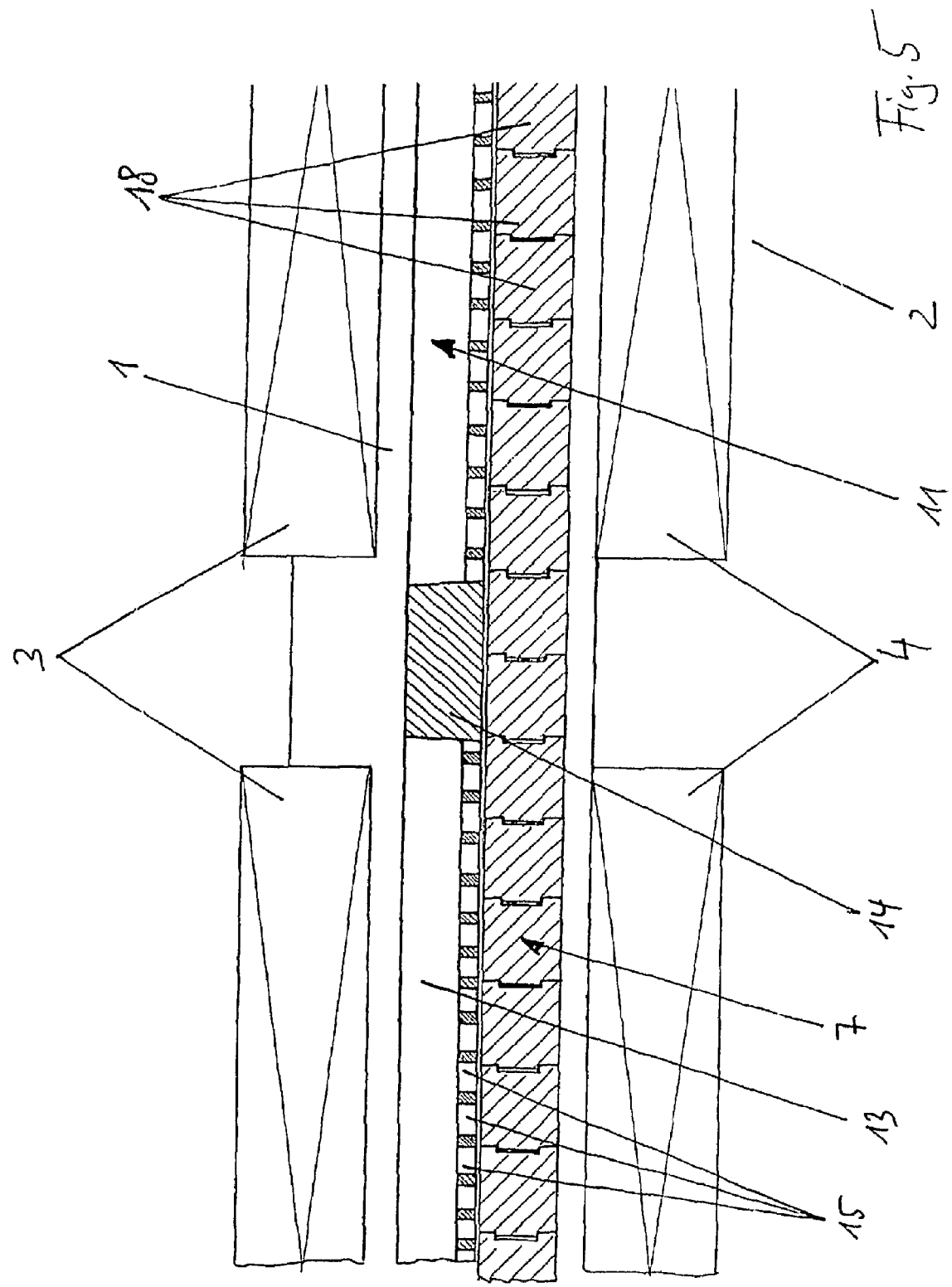
FIG. 5 shows a section of a partial view of a containment shell with a magnet arrangement in an input and an output system.

FIG. 5 shows a magnified partial view of the containment shell 5 of the magnetic coupling arrangement subject to the invention between the outer magnet arrangement 3 and the inner magnet arrangement 4. This Figure shows in particular that at the shown exemplary embodiment of the magnetic coupling arrangement subject to the invention, the magnets of the respective magnet arrangement 3,4 are at a particular distance to one another such that no magnet is provided in the area of the support ring 14. In addition, magnets of the outer and of the inner magnet arrangements 3,4 with different polarities (N, S) are located opposite to one another.

For the assembly of the inner and the outer sleeve, initially the profile element 7 together with the outer sleeve is fastened to the flange 6 on the sealing compound 20. Thereafter, the spring element 16 is compressed between the bottom 17 of the profile element 7 and the bottom 12 of the jacket 11. Finally, the jacket 11 is fastened to the bottom 12.

There has thus been shown and described a novel magnetic coupling arrangement for transmitting a torque which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. In a magnetic coupling arrangement for transmitting torque from an input shaft to an output shaft, wherein at least one magnet arrangement is assigned to each of the input shaft and to the output shaft, and wherein a containment shell comprising at least one inner sleeve and at least one outer sleeve extends between the magnet arrangements, the improvement wherein the inner sleeve is formed from at least one profile element that extends approximately in the manner of a coil as a unitary helical band with a mating protrusion and groove on opposite sides, and wherein the outer sleeve is provided for axially retaining the profile element.

2. A magnetic coupling arrangement as set forth in claim 1, wherein the profile element exhibits at a first side a groove and at a second side that is oriented parallel to the first side, a protrusion that is fitted to the groove, such that the protrusion and the groove of adjacent windings of the profile element that extends in the manner of a coil are engaged in one another.

3. A magnetic coupling arrangement as set forth in claim 1, wherein a sealing material is provided at least at one of the two sides of the profile element.

4. A magnetic coupling arrangement as set forth in claim 3, wherein a sealing tape is provided as the sealing material.

5. A magnetic coupling arrangement as set forth in claim 1, wherein the outer sleeve exhibits an approximately cylindrical jacket with an approximately circular bottom.

6. A magnetic coupling arrangement as set forth in claim 5, wherein the jacket is slotted in the longitudinal direction at least in sections.

7. A magnetic coupling arrangement as set forth in claim 5, wherein the jacket is notched in the longitudinal direction at least in sections.

8. A magnetic coupling arrangement as set forth in claim 7, wherein the jacket exhibits several notches in succession in the longitudinal direction.

9. A magnetic coupling arrangement as set forth in claim 8, wherein each notch in the remaining wall thickness of the jacket exhibits at least one hole.

10. A magnetic coupling arrangement as set forth in claim 8, wherein each notch in the remaining wall thickness of the jacket is perforated.

11. A magnetic coupling arrangement as set forth in claim 6, wherein the jacket of the outer sleeve exhibits a means of sealing on at least one of the outer side and on the inner side.

12. A magnetic coupling arrangement as set forth in claim 6, wherein at least one support ring is provided between at least one of the notched and slotted sections of the jacket in the direction of the circumference.

13. A magnetic coupling arrangement as set forth in claim 1, wherein the bottom of the outer sleeve compresses the windings of the profile element such that the profile element can be fastened in the axial direction at a flange that is directly connected to the housing.

14. A magnetic coupling arrangement as set forth in claim 13, wherein a spring-loaded connection is provided between the inner sleeve and outer sleeve.

15. A magnetic coupling arrangement as set forth in claim 14, wherein at least one spring element is located between the bottom of the inner sleeve and the bottom of the outer sleeve.

16. A magnetic coupling arrangement as set forth in claim 14, wherein the bottom of the inner sleeve is fastened to the last winding of the profile element that is pointing in the direction of the bottom.

17. A magnetic coupling arrangement as set forth in claim 1, wherein at least one outer magnet arrangement is provided that is fastened to the input shaft.

18. A magnetic coupling arrangement as set forth in claim 1, wherein at least one inner magnet arrangement is provided that is fastened to the output shaft.

19. A magnetic coupling arrangement as set forth in claim 1, wherein each magnet arrangement exhibits at least one magnet ring that exhibits in the radial direction at least one alternating polarity (N, S).

20. A magnetic coupling arrangement as set forth in claim 17, wherein a plurality of magnet rings with the same polarity (N, S) are arranged in the longitudinal direction with or without gap and form a group.

21. A magnetic coupling arrangement as set forth in claim 20, wherein each magnet arrangement exhibits several groups with differing polarity in relation to one another that are arranged in the longitudinal direction with or without gap.

22. A magnetic coupling arrangement as set forth in claim 20, wherein the respective gap is assigned to a support ring.

23. A magnetic coupling arrangement as set forth in claim 17, wherein the respective magnet arrangements are arranged at the outer sleeve and at the inner sleeve in relation to one another such that magnets with different polarity (N, S) are always located opposite to one another.

* * * * *